United States Patent
Klingenbrunn et al.

(10) Patent No.: US 7,558,343 B2
(45) Date of Patent: Jul. 7, 2009

(54) TAP-SELECTABLE VITERBI EQUALIZER

(75) Inventors: Thomas Klingenbrunn, San Diego, CA (US); Lichung Chu, San Diego, CA (US); Antoine J. Rouphael, Escondido, CA (US); Benny Vejlgaard, San Diego, CA (US)

(73) Assignee: Siemens Aktiengesellschaft, Munich (DE)

( * ) Notice: Subject to any disclaimer, the term of this patent is extended or adjusted under 35 U.S.C. 154(b) by 1306 days.

(21) Appl. No.: 09/990,844

(22) Filed: Nov. 21, 2001

(65) Prior Publication Data

US 2003/0099311 A1 May 29, 2003

(51) Int. Cl.
*H04L 27/06* (2006.01)
*H03M 13/03* (2006.01)

(52) U.S. Cl. ............................ 375/341; 714/795
(58) Field of Classification Search ................. 375/341, 375/265, 233, 229, 236, 261, 316, 230, 232; 714/795, 786, 792, 794–796
See application file for complete search history.

(56) References Cited

U.S. PATENT DOCUMENTS

| 5,150,381 | A | * | 9/1992 | Forney et al. | 375/261 |
|---|---|---|---|---|---|
| 5,402,445 | A | | 3/1995 | Matsuura | 375/229 |
| 5,588,028 | A | * | 12/1996 | Parizhsky | 375/341 |
| 5,623,511 | A | * | 4/1997 | Bar-David et al. | 375/143 |
| 5,640,432 | A | * | 6/1997 | Wales | 375/346 |
| 5,644,603 | A | * | 7/1997 | Ushirokawa | 375/341 |
| 5,673,294 | A | * | 9/1997 | Namekata | 375/341 |
| 5,825,832 | A | * | 10/1998 | Benedetto | 375/341 |
| 6,690,739 | B1 | * | 2/2004 | Mui | 375/265 |
| 6,751,775 | B2 | * | 6/2004 | Chu et al. | 714/795 |
| 6,813,744 | B1 | * | 11/2004 | Traeber | 714/795 |
| 2002/0181574 | A1 | * | 12/2002 | Aizawa et al. | 375/232 |
| 2003/0048838 | A1 | * | 3/2003 | Sexton et al. | 375/229 |
| 2003/0053535 | A1 | * | 3/2003 | Malkov et al. | 375/233 |
| 2003/0058974 | A1 | * | 3/2003 | Pirainen | 375/348 |

FOREIGN PATENT DOCUMENTS

DE WO0111842 * 2/2001
DE WO0111842 A2 * 2/2001

OTHER PUBLICATIONS

Erich et al, "Reduced-States Sequence Estimation with Tap-Selectable Decision Feedback," IEEE, 2000, pp. 372-376.*

* cited by examiner

*Primary Examiner*—Tesfaldet Bocure

(57) ABSTRACT

A tap-selectable Viterbi equalizer comprises means for determining at least one symbol from a previous determination assigned to a first state, means for determining a second state of the plurality of states and determining a surviving path metric by comparing path metrics originating from the determined symbol, means for determining the value of a previous symbol with respect to the symbol of the surviving state, and calculating means for generating a reduced trellis by calculating only path metrics for states in which the previous symbol has the determined value.

20 Claims, 4 Drawing Sheets

TAP-SELECTABLE VITERBI EQUALIZER

BACKGROUND OF THE INVENTION

The present invention relates generally to a Viterbi equalizer and in particular to a tap-selectable Viterbi equalizer.

Viterbi equalizers are used for decoding intersymbol interference channels for digital communication. In decoding an intersymbol interference channel, maximum likelihood sequence estimation, implemented with a Viterbi equalizer, has a significant performance gain compared to other detection techniques. However, the implementation complexity of maximum likelihood sequence estimation is generally larger than other detection techniques, and the increase in complexity could present a challenge for low-power and high-speed implementation. It is therefore desirable to reduce the implementation complexity of the Viterbi equalizer at the expense of a reasonable, preferably negligible, performance loss compared to maximum likelihood sequence estimation.

A Viterbi equalizer implements the maximum likelihood sequence estimation with a recursive approach. The transmitted symbols $a_1, a_2 \ldots a_n$ are sent through a time dispersive channel, which can be modeled as a tapped delay line with coefficients $h_1, h_2 \ldots h_L$. The k'th signal-value out of the channel are given as $$r_k = \sum_{i=1}^{L} h_i a_{k-i} = h_1 a_k + h_2 a_{k-1} + \ldots + h_L a_{k-L+1} \quad (1)$$

Here, $a_k$ is the current symbol and $a_{k-1} \ldots a_{k-L+1}$ are the previous symbols.

The state is defined as the set of previous symbols $[a_{k-1} \ldots a_{k-L+1}]$ which are currently in the delay line, and this set has length L−1. Since each symbol can take X possible values, the total number of possible states is given as $X^{L-1}$. All the possible transitions between all the states from the previous symbol k−1 (originating state) to the current symbol k (destination state) form a state trellis with $X^{L-1}$ states.

The complexity of the Viterbi equalizer, in other words the number of states in the trellis, which shows the transition from multiple previous states to multiple current states, is given as a symbol alphabet raised to the length of the channel memory minus one. This length is equal to $X^{L-1}$, where X is number of different characters per symbol and L the number of symbols in a trellis code. Within an environment with X=2, such as a direct digital representation in which one character, for example "−1", represents a digital zero and one character, for example "1", represents a digital one, the complexity is limited and channel lengths of up to 5 symbols will not cause a big burden on a signal processor. However, faster standards require more different characters per symbol. For example, X=8 could be a possible number of characters per symbol in a high-speed application. Other higher numbers for X are possible to increase transmission speed. As can be readily seen, for example, with X=8, the number of states increases dramatically.

A delayed decision feedback sequence estimator (DDFSE) is a technique to reduce the number of states in the trellis by detecting the older symbols in the tapped delay line. However, the DDFSE can give poor performance in cases where the channel energy extends outside the DDFSE memory. One way to combat this problem is by applying pre-filtering which results in a minimum-phase system. However, this creates additional noise and computational load and may result in numerical instability.

It is desirable to provide a Viterbi equalizer that reduces the complexity of processing power without the disadvantages of the prior art.

SUMMARY OF THE INVENTION

According to an embodiment, the present invention provides a method of determining a reduced trellis from a sequence of symbols in a Viterbi detector. The method includes the steps of determining the value of a previous symbol from the sequence of symbols, and generating the reduced trellis by calculating only path metrics for states in which the previous symbol has the determined value.

In a more specific embodiment, the step of determining the value comprises the steps of determining at least one symbol from a previous determination including a plurality of current states; determining destination states for the determined symbol and determining a surviving path metric by comparing path metrics originating from the states of the determined symbol; and determining the value of a previous symbol with respect to the determined symbol of the surviving state.

According to yet another embodiment, the present invention provides a method of reducing the number of path metric calculations in the trellis of a Viterbi equalizer receiving a sequence of symbols. The method includes steps of performing a preliminary decision of at least one of the previous symbols in the sequence of symbols; identifying a subset of destination states which are excluded from the calculation and determining for each of the remaining destination states a survivor path by comparing all path metrics to this state. The method also includes the steps of determining the most likely of the survivor paths and determining the value of the oldest symbol in the symbol sequence from this survivor path; and generating the trellis by calculating path metrics only for states in which the oldest symbol is identical to the determined value.

According to another exemplary embodiment, the present invention provides a tap-selectable Viterbi equalizer. The equalizer includes means for determining at least one symbol from a previous determination assigned to a first state, means for determining a second state of the plurality of states and determining a surviving path metric by comparing path metrics originating from the determined symbol, means for determining the value of a previous symbol with respect to the symbol of the surviving state, and calculating means for generating a reduced trellis by calculating only path metrics for states in which the previous symbol has the determined value.

Yet another embodiment of the invention is an arrangement for switching between a plurality of equalizers. The switching device is operated based on the power distribution in the estimated channel impulse response.

A more complete understanding of the embodiments of the present invention and advantages thereof may be acquired by referring to the following description taken in conjunction with the accompanying drawings.

DETAILED DESCRIPTION OF THE SPECIFIC EMBODIMENTS

The various embodiments of the tap-selectable equalizer of the present invention allow for improved performance with only a small increase in computation compared to the delayed decision feedback equalizer according to the prior art. Further, the present invention reduces the need for pre-filtering. The present invention can be useful, for example, in wireless phones and base station data receivers, such as for EDGE (Enhanced Data rate for GSM Evolution) systems.

Figure 1:
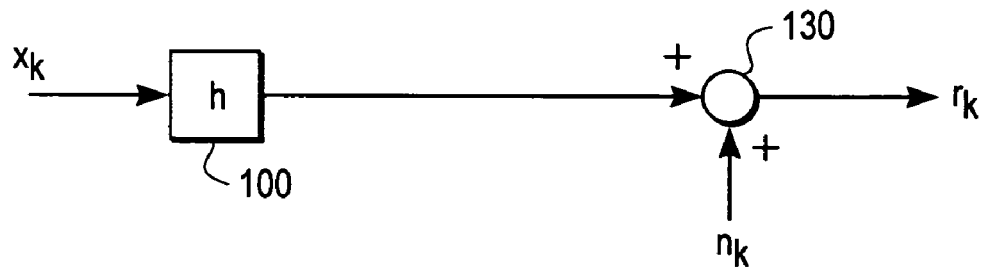
FIG. 1 shows an equivalent block diagram representing the transmission channel characteristics.

To explain the influence of a transmission channel, FIG. 1 shows an equivalent block diagram representing the typical characteristics of a transmission channel. The transmitted symbol $x_k$ is fed to a box 100 representing the channel modeled as a tapped delay line. An additional adder 130 adds white noise n$k$ to the resulting output signal $r_k$ as shown below:

$$r_k = x_k * h_k + n_k \qquad (2)$$

where $r_k$ is the transmitted signal consisting of the transmitted complex valued symbol $x_k$, which is transformed through the channel by function $h_k$ and to which a white Gaussian noise $n_k$ is added. The operator * designates a convolution operation. The complex valued symbol $x_k$ is actually the digital representation of an analog signal. The value $r_k$ is evaluated within a decision feedback equalizer. Typically the ideal representation of a symbol value of digital zero is "−1" and that of a digital one is "1" for a dual character symbol environment. However, as mentioned above, one of a plurality of, for example, 8 different characters can be represented by a single symbol.

Figure 2:
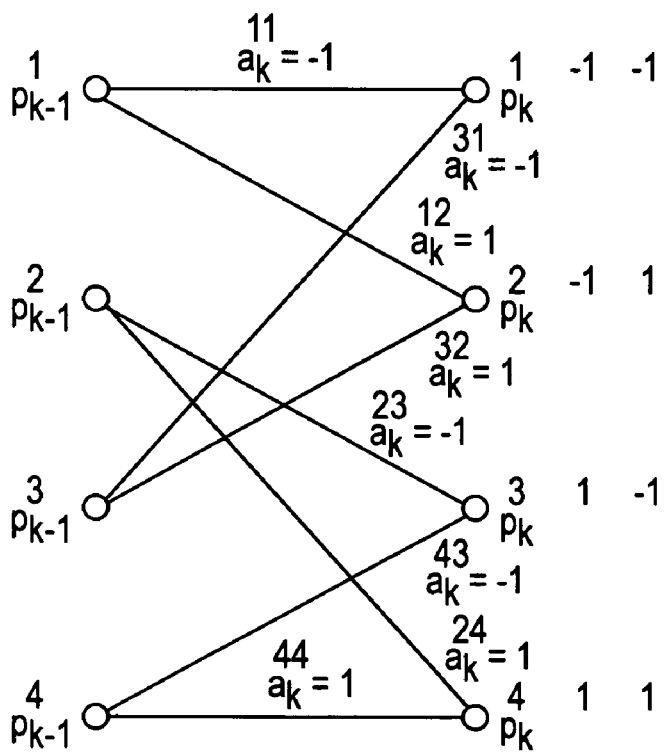
FIG. 2 shows a trellis code determination in a conventional Viterbi equalizer.

The function of a typical Viterbi equalizer according to the prior art will now be explained in conjunction with FIG. 2 which shows the transition of a trellis code determination in such a conventional Viterbi equalizer. A 3-tap Viterbi equalizer receives a sequence of three symbols $a_{k-2}$, $a_{k-1}$, and $a_k$. These three symbols and following sequences will be evaluated within the Viterbi equalizer as follows: a L-tap Viterbi equalizer, which has $2^{L-1}$ states, calculates all path metrics $p_k$ which reflect the probability for a symbol $a_k$ within a sequence of L symbols, wherein $a_k$ is the last symbol in that sequence. To this end, in a 3-tap Viterbi equalizer as shown in FIG. 2, all path metrics $p_k^x$ for all four possible combinations of the previous two symbols $a_{k-2}$ and $a_{k-1}$ have to be determined. The left column in FIG. 2 shows all four possible combinations for $a_{k-2}$ and $a_{k-1}$, namely "−1,−1", "−1,1", "1,−1" and "1,1". Each combination has a previously calculated path metric $p_{k-1}^1$, $p_{k-1}^2$, $p_{k-1}^3$, and $p_{k-1}^4$. There exist eight transition path metrics resulting in four future "$a_{k-2}$ and $a_{k-1}$", which in this determination process are $a_{k-1}$ and $a_k$ and shown on the right column in FIG. 2. To determine the four surviving path metrics $p_k^x$, each pair of transitions for each state is compared and only the best is taken (survives). As mentioned above the next symbol "$a_{k+1}$" becomes $a_k$ and the other symbols are respectively shifted for the next determination process.

Figure 4:
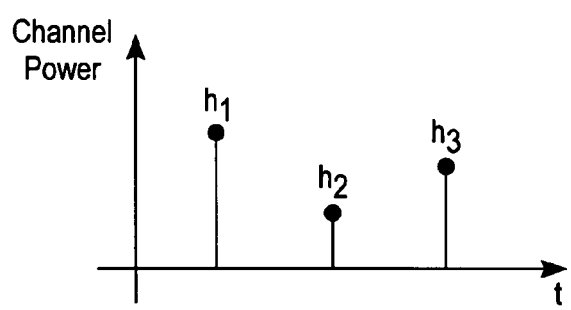
FIG. 4 shows a graph of an example of channel power distribution over time associated to three consecutive symbols.

FIG. 4 shows a graph of an example of the estimated channel power distribution according to a channel impulse response over time associated to three consecutive symbols. To reduce the number of states in the trellis, a channel impulse estimate is determined, so that the preliminary symbol detection is done only for the tap-coefficients with an energy level larger than a certain threshold, set relative to the strongest tap-coefficient. If more than a specific number of taps have sufficient energy, then only the strongest are selected. For the weakest tap or taps, a preliminary symbol decision is made. Based on these preliminary symbol decisions, only a subset of the states in the trellis has to be considered.

The power distribution shown in FIG. 4 indicates that $h_2$ has a low power level and therefore only gives a minor contribution to the branch metric calculation compared to the stronger channel coefficients $h_1$ and $h_3$. Thus, this sequence is ideal for the method described below.

The four 4-state Viterbi equalizer according to FIG. 2 recreates a sequence of symbols by calculating the probabilities for all possible sequences. The sequence which gives the best fit between the real received sequence and the recreated sequence is then selected. A sequence is given as:

$$r_k = \sum_{i=1}^{L} a_{k-i} h_i + n_k \qquad (3)$$

where $r_{k(k=1\ldots N)}$ is the known received signal and $h_{i(i=1\ldots L)}$ are the estimated channel coefficients and $a_{k(k=1\ldots N)}$ are the unknown transmitted symbols and $n_{k(k=1\ldots N)}$ is the unknown white Gaussian noise. FIG. 2 shows the functionality of a 4-state Viterbi equalizer. The current state represents the sequence of two symbols, namely $a_{k-2}$ and $a_{k-1}$. Therefore, four possible sequences are depicted by numerals 1-4. For the next state 8 sequences are possible which are reduced to 4 possible states by means of a minimum decision. The minimum decision selects the path with the lowest path metric or the highest probability. The path metric $p_k$ is given by cumulating all the branch metrics $b_k$:

$$p_k = \sum_{j=1}^{k} b_j \qquad (4)$$

where the branch $b_k$ metric is defined as $$b_k = \left\| r_k - \sum_{i=1}^{L} h_i a_{k-i} \right\|^2 \qquad (5)$$

Thus the path metrics $p_k$ are defined as:

$$p_k^1 = \min(p_{k-1}^1 + b_k^{11}, p_{k-1}^3 + b_k^{31}) \qquad (6)$$

$$p_k^2 = \min(p_{k-1}^2 + b_k^{12}, p_{k-1}^3 + b_k^{32}) \qquad (7)$$

$$p_k^3 = \min(p_{k-1}^2 + b_k^{23}, p_{k-1}^4 + b_k^{43}) \quad (8)$$

$$p_k^4 = \min(p_{k-1}^2 + b_k^{24}, p_{k-1}^4 + b_k^{44}) \quad (9)$$

wherein $$b_k^{xy} = r_k - (a_{k-2}^x h_3 + a_{k-1}^x h_2 + a_k^{xy} h_1) \quad (10)$$

$p_k^x$ represents the survivor path for the k'th symbol in the respective state x and $b_k^{xy}$ is the branch metric between state x and state y for the k'th symbol. Thus, a Viterbi equalizer is able to calculate the most likely next symbol in a sequence of symbols. The results of former calculations will influence the current decision as can be seen from the above equations. Although FIG. 2 shows a 4-state Viterbi equalizer, a Viterbi equalizer with a different number of states can be used. As can be readily seen, the amount of calculations is quite moderate when L=3 and each symbol can adopt only two different characters (here −1 and 1). However, if the trellis code has, for example, five symbols and the number of characters within a symbol is 8, the number of calculations becomes excessive and puts a burden on a digital signal processor.

Therefore, a first embodiment of a Viterbi equalizer according to the present invention will now be explained in conjunction with FIGS. 3A-3C. Again, a 3-tap trellis code is used with binary characters for each symbol. The resulting four states are numbered 1-4 from top to bottom. The following steps will now be performed:

Step 1: performing a preliminary decision of at least one of the previous symbols in the sequence of symbols;

Step 2: identifying a subset of destination states which are excluded from the calculation and determining for each of the remaining destination states a survivor path by comparing all path metrics to this state;

Step 3: determining the most likely of the survivor paths and determining the value of the oldest symbol in the symbol sequence from this survivor path; and Step 4: generating the trellis by calculating path metrics only for states in which the oldest symbol is identical to the determined value.

Figures 3A, 3B, 3C:
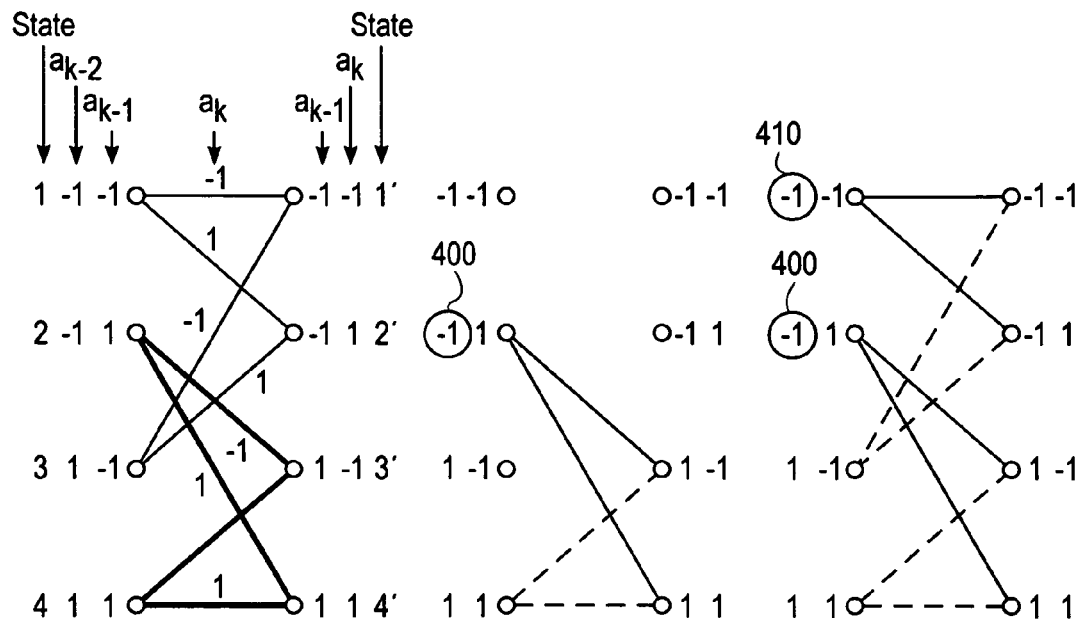
FIGS. 3A-3C show the trellis code determination in a Viterbi equalizer according to a first embodiment of the present invention.

Turning now to FIG. 3A, at that time no path metrics for $p_k^x$ have been calculated. However, path metrics for $p_{k-1}^x$ are present, indicating which character for $a_{k-1}$ was most likely. In this example, state 2 is assumed to have the highest probability and therefore "1" is assumed to be the most likely character for $a_{k-1}$. This state can transition to either state 3' or 4' depending on the character of $a_k$. Therefore, only state 2 and state 4, both ending at the same states 3' and 4', will be considered in the next step.

The next step is shown in FIG. 3B. In this step, the survivor pair of these four transitions is determined. To this end, the probabilities of both paths for each state are calculated. It is again assumed that the transitions of state 2 generate the highest path metric pairs $p_k^3$ and $p_k^4$. Thus, the most likely character for $a_{k-2}$ (the oldest symbol in the tapped delay line) can now be determined. In the present example, this character would be a "−1" as indicated by the numeral 400. If the decisions on $a_{k-2}$ differ, then $a_{k-2}$ is derived from the state with the smallest survivor path metric.

In the last step, shown in FIG. 3C the starting points for the transition calculation are determined to be state 1 and state 2, as $a_{k-2}$ is equal "−1" for both states (indicated by numerals 400 and 410 in FIG. 3C). The remaining transitions will not be calculated, and therefore branch and path metrics do not have to be calculated. Furthermore, no comparison of the respective values is necessary.

Figure 5A:
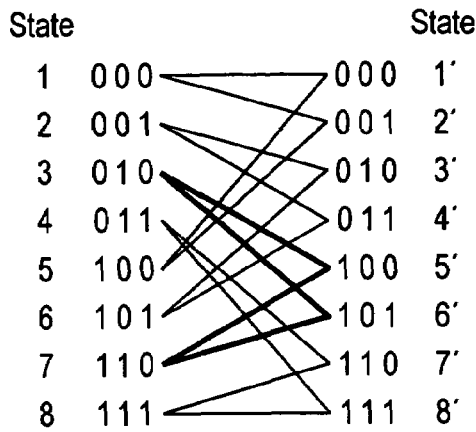
FIGS. 5A-5C show the reduced trellis code determination in a Viterbi equalizer according to a first embodiment of the present invention.
Figure 5B:
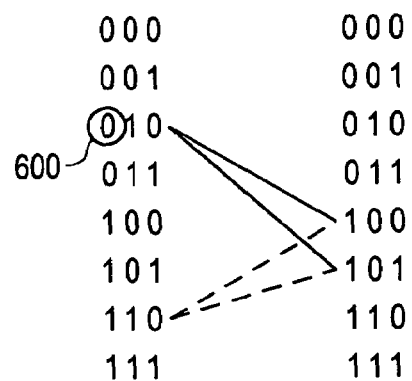
Figure 5C:
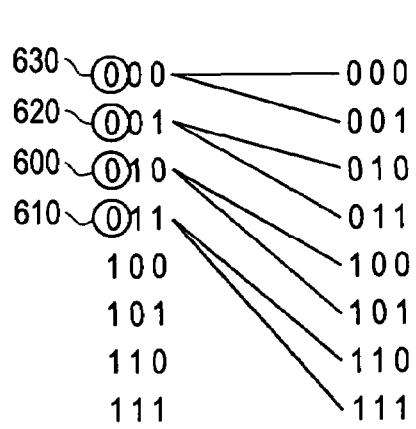
Figure 6:
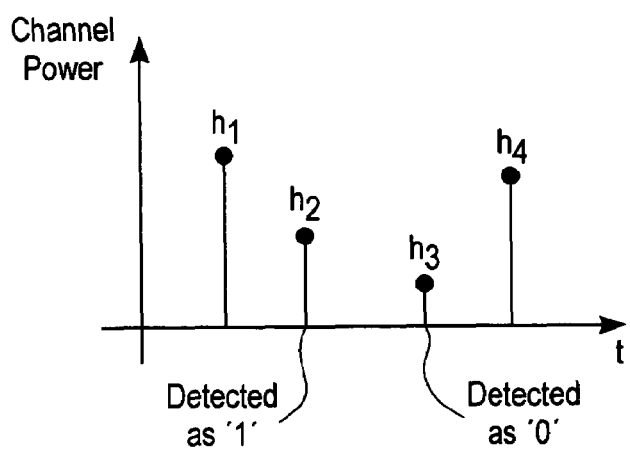
FIG. 6 shows a graph of an example of channel power distribution over time associated to four consecutive symbols.

FIGS. 5A-C show the transition of a trellis code determination in a Viterbi equalizer according to a second embodiment of the present invention. For a better overview the digital representation using "0" and "1" instead of the mathematical representation of "−1" and "1" is used throughout the following figures. The respective channel power distribution is shown in FIG. 6. As can be readily seen, the power distribution for signals $h_2$ and $h_3$ are lower than for $h_1$ and h4. In this 4-tap example of a trellis sequence, it is assumed that previously state 3 had the minimum error or highest probability. Thus, the sequence for $a_{k-2}$ and $a_{k-1}$ is "1, 0". As described above, in the next step it is determined that only transitions of state 3 and 7 are calculated which result in the next state 5' and 6'. In FIG. 5B, it is assumed that previous state 3 provides the survivor paths. Thus, as indicated by numeral 600, $a_{k-2}$ is determined as "0". With this decision made, all "0" characters for $a_{k-3}$ will be used as indicated by numerals 600, 610, 620, 630 in FIG. 5C. In the following step the starting points 600, 610, 620, 630 for the transition calculation are used to calculate the respective path metrics. Again, the remaining transitions will not be calculated, and therefore branch and path metrics for those starting points do not have to be calculated as indicated by the dotted lines in FIG. 5C. Thus, no comparison of the respective values is necessary.

The complexity can be evaluated as follows: the calculations can be divided into the number of path metric calculations, the number of survivor calculations, and the number of path metric calculations to populate the trellis. Table 1 shows calculation requirements for three different schemes, wherein VE indicates a Viterbi Equalizer as shown in FIG. 2, DDFSE indicates a Delayed Feedback Sequence Estimator, and TS-VE a Tap-Selectable Viterbi Equalizer according to the present invention. μ defines the number of states used in step 2 (Partial Viterbi) of this invention.

TABLE 1

|  | Path Metrics | Survivor | Populate |
| --- | --- | --- | --- |
| VE | $|X|^L$ | $|X|^{L-1}$ | 0 |
| DDFSE | $|X|^{\mu+1}$ | $|X|^\mu$ | 0 |
| TS-VE | $|X|^{\mu+1}$ | $|X|^\mu$ | $|X|^{L-1} - |X|^\mu$ |

Although it uses more calculations than the Delayed Decision Feedback Sequence Estimator, the Tap-Selectable Viterbi Equalizer uses much less than the standard Viterbi Equalizer and does not show the disadvantages of the DDFSE as explained previously Table 2 shows the number of calculations as an example for a 5-tap channel, with

|X|=8.

TABLE 2

|  | Path Metrics | Survivor | Populate |
| --- | --- | --- | --- |
| VE | 32768 | 4096 | 0 |
| DDFSE [μ = 3] | 512 | 64 | 0 |
| TS-VE | 512 | 64 | 4032 |

Figure 7:
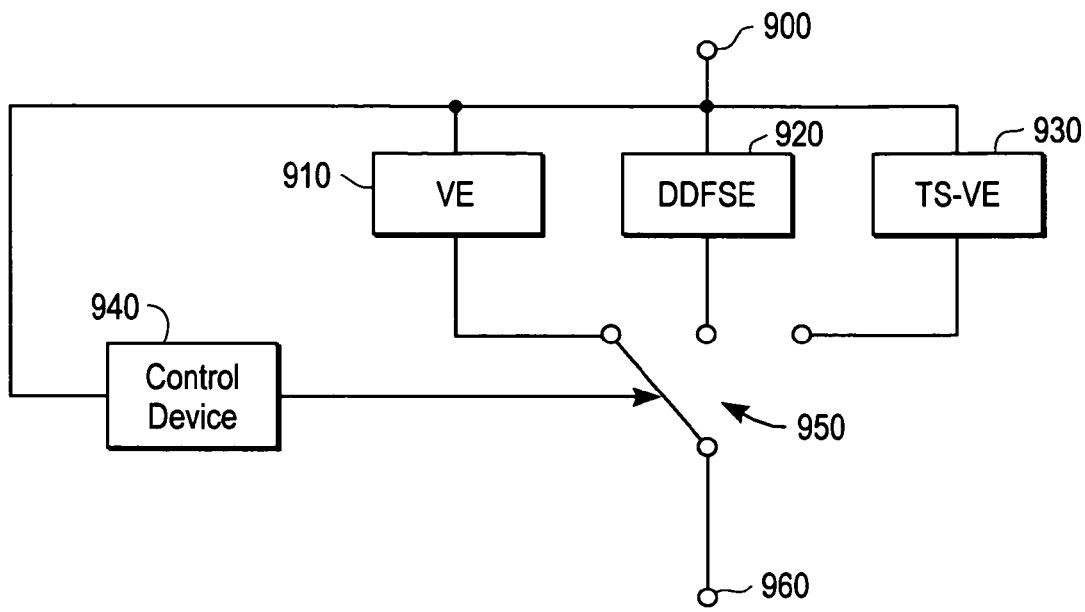
FIG. 7 shows a block diagram of another exemplary embodiment according to the present invention.

FIG. 7 shows a block diagram of another exemplary embodiment according to the present invention. To combine the best of all techniques, FIG. 7 shows a Viterbi equalizer 910, a Delayed Decision Feedback Sequence Estimator 920 and a Tap-Selectable Viterbi Equalizer 930. All three equalizers receive the same input signal from terminal 900. A control device 940 is determining through a switch 950 which equalizer is used. The selected output signal is then fed to terminal 960. Of course, in other embodiments the Tap-Selectable Viterbi Equalizer 930 is one of at least two equalizers used in such a configuration, where the multiple equalizers receive the same input signal and a control device 940 determines through a switch which of the multiple equalizer's output to use.

Figure 8:
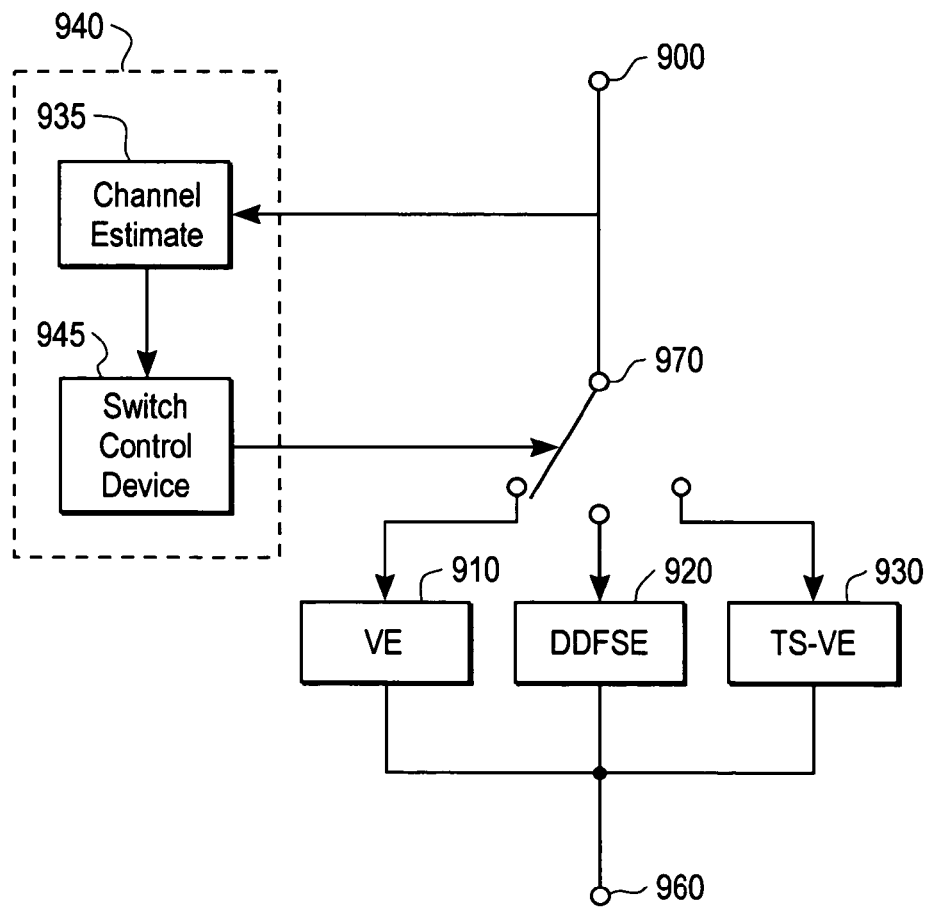
FIG. 8 shows a block diagram of yet another exemplary embodiment according to the present invention.

FIG. 8 shows another embodiment in which the switch referred to by numeral 970 is moved to the input side of the multiple equalizers. Thus, the input of one of the three equalizers is fed with the input signal received at terminal 900 and accordingly one output from the selected equalizer is output at terminal 960, according to this embodiment. The control device 940 (similar to that of FIG. 7) is shown in more detail in FIG. 8 as including a channel estimator 935 which receives the input signal and generates an output signal fed to the switch control device 945 which controls the switch 970. Again, in other embodiments the Tap-Selectable Viterbi Equalizer 930 is one of at least two equalizers used in such a configuration, where one of the multiple equalizers is selected to receive the input signal, as determined by a control device 940, and thus to provide that equalizer's output.

Control device 940 determines the selection based on the channel impulse response estimate. To this end, either the current channel power distribution as shown in FIGS. 4 and 6 or any other suitable information about the channel characteristics can be used. In FIG. 8, a channel estimator 935 is used to determine the channel power distribution. Assume that the channel length is 4 taps. For example, according to FIG. 6, when all $h_1$, $h_2$, $h_3$ and $h_4$ are approximately equal the standard Viterbi equalizer is used. When $h_1$ and $h_2$ are large and $h_3$ and $h_4$ are small the DDFSE is used; and when $h_1$ is large, $h_2$ is small, $h_3$ is large and h4 is small the Tap-Selectable Viterbi Equalizer is selected.

Generally, the standard Viterbi Equalizer is used when the channel has a long impulse response, and thus many taps in the sequence have a high energy level. Whenever a short impulse response is present, the Delayed Decision Feedback Sequence Estimator is used. In this case, there will be only a few taps with a high energy level, (such as when $h_1$ and $h_2$ are large and $h_3$ and h4 are small as discussed above). Whenever a low energy tap is located in the middle of a sequence, the Tap-Selectable Viterbi Equalizer is selected (such as when $h_1$ is large, $h_2$ is small, $h_3$ is large and h4 is small as discussed above). In an embodiment with only a Tap-Selectable Viterbi Equalizer and a Delayed Decision Feedback Sequence Estimator, the Tap-Selectable Viterbi Equalizer is then selected only if there is a low energy distribution in the middle of the symbol sequence.

As generally discussed above, another embodiment according to FIG. 8 includes only two of the three shown equalizer units, for example, the Tap-selectable Viterbi Equalizer and the regular Viterbi Equalizer or the Delayed Decision Feedback Sequence Estimator. Yet another embodiment comprises the regular Viterbi Equalizer and the Delayed Decision Feedback Sequence Estimator. A plurality of different equalizer units can be implemented, whereby each equalizer unit is suitable to calculate a trellis for a specific power distribution of a respective symbol sequence. All exemplary embodiments can be preferably implemented by a suitable digital signal processor.

In summary, the method of determining a reduced trellis from a sequence of symbols in a Viterbi detector according to an exemplary embodiment of the present invention includes determining the value of a previous symbol from the sequence of symbols; and generating the reduced trellis by calculating only path metrics for states in which the previous symbol has the determined value. The step of determining the value of a previous symbol can include the steps of determining at least one symbol from a previous determination including a plurality of current states; determining destination states for the determined symbol and determining a surviving path metric by comparing path metrics originating from the states of the determined symbol; and determining the value of a previous symbol with respect to the determined symbol of the surviving state.

Preferably, the previous symbol is the oldest symbol. More specifically for longer sequences having n symbols, the previous determination usually includes a sub-sequence of n−1 symbols. Thus, the determination of at least one symbol can comprise a sub-sequence of up to the last n−2 symbols. The method can further be executed depending on power distribution of said sequence of symbols and in addition can be performed for those sub-sequences in which the power distribution of the n−2 symbols is below a predefined threshold.

What is claimed is:

1. A method of reducing the number of path metric calculations in a trellis of a Viterbi equalizer, the method comprising the steps of:
   receiving a sequence of symbols by said Viterbi equalizer,
   performing a preliminary decision of at least one of the previous symbols in the sequence of symbols within said Viterbi equalizer;
   identifying a subset of destination states which are excluded from path metric calculations within said Viterbi equalizer and determining for each of the remaining destination states a survivor path by comparing all path metrics to this state;
   determining the most likely of the survivor paths within said Viterbi equalizer and determining the value of the oldest symbol in the symbol sequence from this survivor path;
   generating the trellis within said Viterbi equalizer by calculating path metrics only for states in which the oldest symbol is identical to the determined value; and
   decoding said sequence of symbols with said Viterbi equalizer using the trellis.

2. The method according to claim 1, wherein the sequence comprises n symbols and said previous symbols are a sub-sequence of n−1 symbols and said preliminary decision of at least one symbol comprises a sub-sequence of up to the last n−2 symbols.

3. The method according to claim 1, wherein said method is executed depending on the channel power distribution.

4. The method according to claim 1, wherein the sequence comprises n symbols and said previous symbols are a sub-sequence of n−1 symbols and said preliminary decision of at least one symbol comprises a sub-sequence of up to the last n−2 symbols and wherein the power distribution of said n−2 symbols is below a predefined threshold.

5. A method of determining a reduced trellis from a sequence of symbols in a Viterbi detector comprising the steps of:
   receiving the sequence of symbols by said Viterbi equalizer,
   determining a symbol value of a previous symbol from the sequence of symbols within said Viterbi equalizer;
   generating said reduced trellis within said Viterbi equalizer by calculating only path metrics for states in which the previous symbol has the determined symbol value; and
   decoding the sequence of symbols with said Viterbi equalizer using said reduced trellis.

6. The method according to claim 5, wherein the step of determining comprises the steps of:
   determining at least one symbol from a previous determination including a plurality of current states;

determining destination states for the determined symbol and determining a surviving path metric by comparing path metrics originating from the states of the determined symbol; and determining the value of a previous symbol with respect to the determined symbol of the surviving state.

7. The method according to claim 6, wherein the previous symbol is the oldest symbol.

8. The method according to claim 6, wherein said sequence has n symbols and said previous determination includes a sub-sequence of n−1 symbols and said determination of at least one symbol comprises a sub-sequence of up to the last n−2 symbols.

9. The method according to claim 6, wherein said method is executed depending on power distribution of said sequence of symbols.

10. The method according to claim 9, wherein said sequence has n symbols and said previous determination includes a sub-sequence of n−1 symbols and said determination of at least one symbol comprises a sub-sequence of up to the last n−2 symbols and wherein the power distribution of said n−2 symbols is below a predefined threshold.

11. A tap-selectable Viterbi equalizer comprising:
means for determining at least one symbol from a previous determination assigned to a current state;
means for determining a destination state of a plurality of states and determining a surviving path metric by comparing path metrics originating from the determined symbol;
means for determining the value of a previous symbol with respect to the symbol of the surviving state;
calculating means for generating a reduced trellis by calculating only path metrics for states in which the previous symbol has the determined value.

12. The tap-selectable Viterbi equalizer according to claim 11, wherein said means for determining and said calculation means are implemented by a digital signal processor.

13. An arrangement for determining a trellis from a sequence of symbols comprising:
a plurality of equalizers receiving said sequence of symbols each generating a trellis,
wherein said equalizers include a tap-selectable Viterbi equalizer;
a select unit for activating one of the equalizers, and
a control unit receiving said sequence of symbols and for determining a power distribution of said sequence of symbols and controlling said select unit depending on said power distribution,
wherein said tap-selectable equalizer comprises:
means for determining at least one symbol from a previous determination assigned to a current state;
means for determining a destination state of said plurality of states and determining a surviving path metric by comparing path metrics originating from the determined symbol;
means for determining the value of a previous symbol with respect to the symbol of the surviving state; and
calculating means for generating a reduced trellis by calculating only path metrics for states in which the previous symbol has the determined value.

14. The arrangement according to claim 13, wherein said equalizers include:
a Viterbi equalizer receiving said sequence of symbols generating a first trellis; and
a tap-selectable Viterbi equalizer receiving said sequence of symbols generating a second trellis.

15. The arrangement according to claim 13, further comprising a delayed decision feedback equalizer receiving said sequence of symbols generating a third trellis fed to said select unit.

16. The arrangement according to claim 13, wherein said equalizers include:
a delayed decision feedback sequence estimator receiving said sequence of symbols generating a first trellis; and
a tap-selectable Viterbi equalizer receiving said sequence of symbols generating a second trellis.

17. The arrangement according to claim 13, wherein said equalizers include:
a delayed decision feedback sequence estimator receiving said sequence of symbols generating a first trellis; and
a Viterbi equalizer receiving said sequence of symbols generating a second trellis.

18. An arrangement for determining a trellis from a sequence of symbols comprising:
a plurality of equalizers capable of receiving said sequence of symbols and generating a trellis, said plurality of equalizers including a tap-selectable Viterbi equalizer;
a select unit for activating one of the equalizers, and
a control unit for determining an output from one of said plurality of equalizers receiving said sequence of symbols and for determining a power distribution of said sequence of symbols and controlling said select unit depending on said power distribution,
wherein said tap-selectable equalizer comprises:
means for determining at least one symbol from a previous determination assigned to a current state;
means for determining a destination state of said plurality of states and determining a surviving path metric by comparing path metrics originating from the determined symbol;
means for determining the value of a previous symbol with respect to the symbol of the surviving state; and
calculating means for generating a reduced trellis by calculating only path metrics for states in which the previous symbol has the determined value.

19. The arrangement according to claim 18, wherein:
said control unit determines which one of said plurality of equalizers will receive said sequence of symbols and generate a trellis to output.

20. The arrangement according to claim 18, wherein:
said control unit determines which one of the trellis generated by said plurality of equalizers receiving said sequence of symbols is output.

* * * * *